No. 620,724. Patented Mar. 7, 1899.
H. TESSEYMAN.
BRAKE MECHANISM.
(Application filed July 16, 1898.)
(No Model.)
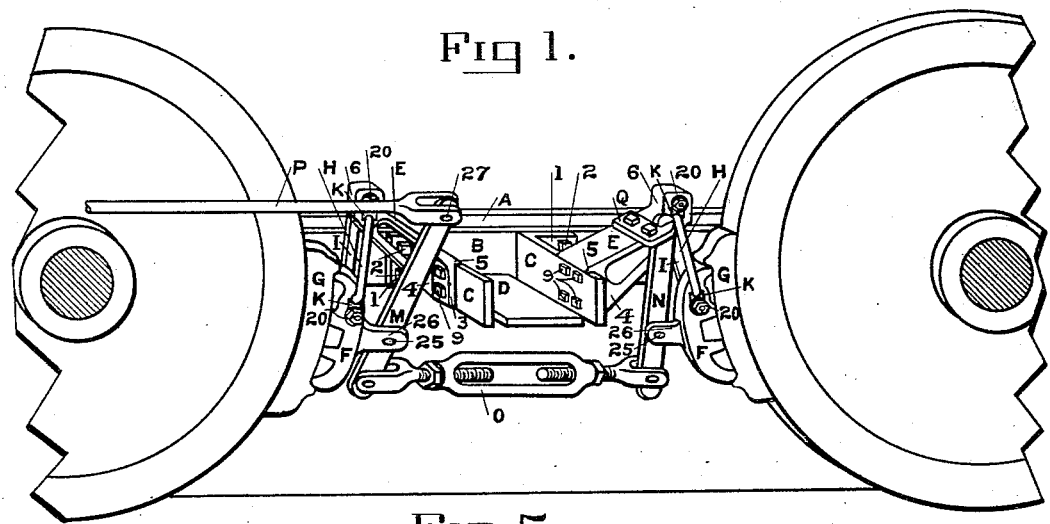
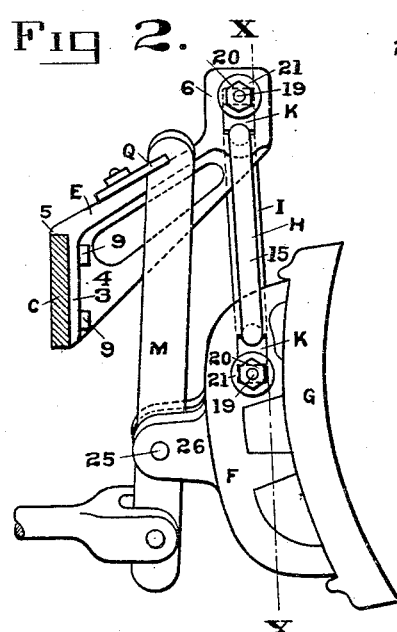
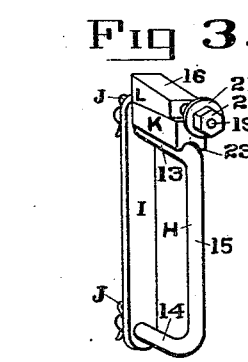
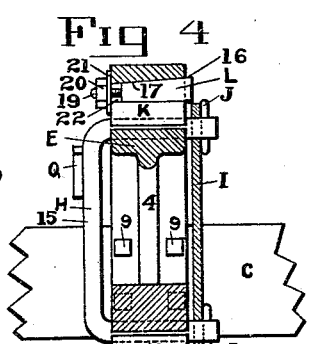
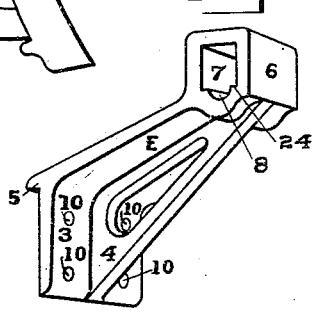
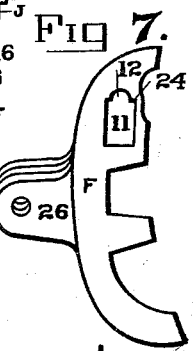
Attest:
E. B. Lehman
H. C. Colson.
Inventor.
Henry Tesseyman
By J. Kirby, his Atty.

UNITED STATES PATENT OFFICE.

HENRY TESSEYMAN, OF DAYTON, OHIO, ASSIGNOR TO THE BARNEY & SMITH CAR COMPANY.

BRAKE MECHANISM.

SPECIFICATION forming part of Letters Patent No. 620,724, dated March 7, 1899.

Application filed July 16, 1898. Serial No. 686,113. (No model.)

*To all whom it may concern:*

Be it known that I, HENRY TESSEYMAN, a citizen of the United States, residing at Dayton, in the county of Montgomery and State of Ohio, have invented a certain new and useful Improvement in Brake Mechanism, of which the following is a specification, reference being had therein to the accompanying drawings.

My invention relates to brake mechanism for car-trucks, and has for its object to provide means for taking up the wear between the brake-hangers and the bearings in which they operate, the manner in which I accomplish said object, together with details of construction and arrangement of parts, being hereinafter fully described, pointed out in the claims at the end of this specification, and shown in the accompanying drawings, in which—

Figure 1 is a perspective view of a portion of a car-truck with brake mechanism embodying my invention applied thereto; Fig. 2, a side view of the brake-operating mechanism and brake-hanger bracket on the dead-lever side detached from the truck-frame; Fig. 3, a perspective view of the brake-hanger, adjusting-block, and adjustable bearing detached; Fig. 4, a cross-section through the line X X of Fig. 2; Fig. 5, a perspective view of the adjustable bearing and adjusting-block detached; Fig. 6, a perspective view of the brake-hanger bracket detached, and Fig. 7 a side view of the brake-head detached.

Similar letters and numerals of reference indicate like parts in all the figures of the drawings.

A and B represent side bars of the truck-frame at one side thereof, those of the opposite side being removed for the purpose of presenting an unobstructed view of the brake mechanism.

C represents cross-bars which are secured at each side of the truck-frame to the side bars B by means of flanges 1 and bolts 2, D being a stiffening-plate arranged between the cross-bars C and which may be secured to the side bars in any suitable manner.

E represents a brake-hanger bracket or support preferably formed in a single piece and provided with a flange 3, web 4, shoulder 5, and hollow sleeve 6, forming a pocket 7, having a depression 8, the function of which pocket and depression will presently appear. One of these supports is secured to each of the cross-bars C at each side of the truck and in proper relation to the wheels by bolts 9, which pass through holes 10, registering with corresponding holes in the said cross-bars, the shoulder 5 resting on the upper edge of cross-bars C, as more clearly shown in Figs. 1 and 2.

F represents a brake-head, and G a brake-shoe attached thereto, the brake-head being provided with a pocket 11 and a depression 12, and it may otherwise be of any well-known type and connected with the brake-shoe in the usual manner, and they are carried by the brake-hanger bracket E by means of brake-hanger H, which is preferably made from a single piece of round iron or steel, having portions 13 and 14 of its ends turned at right angles to its center portion 15 to form journals upon which the said brake-hanger and the brake-head are free to oscillate, the free ends of the brake-hanger being tied together by a tie plate or brace I, which is pierced near each of its ends to engage the portions 13 and 14, and which when so engaged is prevented from disengagement by means of ordinary cotter-keys J, which engage holes in the ends of the brake-hanger, as clearly shown in Fig. 3. The journal 13 has a bearing in the depression 8, formed in the pocket 7 of the brake-hanger bracket E, and the journal 14 has a bearing in the depression 12, formed in the pocket 11 in the brake-head. Heretofore much annoyance and expense in maintenance has been caused by reason of there being no practical or efficient means provided in the construction of brake mechanism for taking up the wear on the brake-hanger journals and bearings caused by the constant swinging movement of these parts, and to obviate this difficulty I provide a loose or adjustable bearing K and place one of the same in the pocket 7 of the brake-hanger bracket E and one in the pocket 11 in the brake-head F to form bearings for the outer half of journals 13 and 14, and at the back of each of these loose bearings I place an adjusting-block L, having an inclined surface 16, which registers with corresponding inclines 17 and 18, formed in the walls of the pockets 7 and 11. The adjusting-block L is provided with a screw-threaded stud 19, and when the parts are first assembled for use the adjusting-block L is so fitted with relation to the bearings K and their respective pockets in the brake-hanger bracket and brake-head as that when drawn up tight by means of the screw-threaded studs 19 and nuts 20, the latter bearing against washer 21, a space 22 will be left between the end of the adjusting-block and the inside of said washer, which bears against the faces of the brake-hanger and brake-head, as clearly shown in Fig. 4. Therefore as the journals 13 and 14 and their respective bearings wear away proper adjustment of these parts can be maintained by screwing up the nuts 20, which will draw the adjusting-block forward, and thus compensate for such wear so long as there remains any space between the faces 23 and 24 of the journal-bearings, a sufficient amount of which is provided for when the parts are first fitted together. The brakes are operated by the usual levers M and N, which are pivoted at 25 to arms 26, extending from the brake-heads, and which are pivotally connected by means of a turnbuckle O, the lever M being operated by a rod P, pivoted thereto at 27. A dead-lever stop Q is bolted to each of the brackets E on the dead-lever side of the brake mechanism.

It is to be understood that my improvement can be employed in connection with various types of brake mechanism in common use, and it is obvious that the details of construction herein shown and described can be departed from without departing from the spirit of the invention. I do not therefore limit the invention to such exact details of construction.

Having thus fully described my invention, I claim—

1. A brake mechanism having in combination, a swinging brake-hanger and a support therefor, the said brake-hanger being provided with a journal having a lower bearing in said support and an upper bearing in a separate bearing carried in a pocket in said support, and means intermediate the said separate bearing and the wall of said pocket whereby the said journal and said bearings can be adjusted to each other, substantially as set forth.

2. A brake mechanism having in combination, a swinging brake-hanger, a support therefor, and a brake-head, the said brake-hanger being provided with journals having bearings partially in said support and partially in said brake-head, separate bearings carried in pockets in said support and in said brake-head and forming partial bearings for said journals, and means intermediate the said separate bearings and the walls of said pockets whereby the said journals and the said bearings therefor can be adjusted to each other, substantially as set forth.

3. In a brake mechanism the combination of a swinging brake-hanger, a support therefor, a journal forming part of said brake-hanger, a bearing in said support for a portion of said journal, a pocket in said support, a removable bearing carried therein for a portion of said journal, an adjusting-block intermediate the said removable bearing and the wall of said pocket, and means whereby the said adjusting-block can be made to adjust said bearings to said journal, substantially as set forth.

4. In a brake mechanism the combination of a swinging brake-hanger, a support therefor, a brake-head, journals forming part of said brake-hanger, bearings formed in said support and said brake-head for portions of said journals, pockets in said support and said brake-head, removable bearings carried in said pockets for portions of said journals, adjusting-blocks intermediate the said removable bearings and the walls of said pockets, and means whereby the said adjusting-blocks can be made to adjust said bearings to said journals, substantially as set forth.

5. The combination with a car-truck, of the brake-hanger support E, brake-hanger H, brake-head F, adjustable bearings K, adjusting-blocks L, and means for adjusting the latter whereby proper adjustment of the brake-hanger journals with relation to their bearings may be maintained, substantially as set forth.

In testimony whereof I hereunto subscribe my name this 13th day of July, A. D. 1898.

HENRY TESSEYMAN.

In presence of—
J. KIRBY, Jr.,
N. EMMONS, Jr.